(12) United States Patent
Burgin

(10) Patent No.: US 6,216,586 B1
(45) Date of Patent: Apr. 17, 2001

(54) DEVICE FOR COOKING FOWL

(76) Inventor: Jesse C. Burgin, 4501 Hickory Grove Dr., Acworth, GA (US) 30102

(*) Notice: Subject to any disclaimer, the term of this patent is extended or adjusted under 35 U.S.C. 154(b) by 0 days.

(21) Appl. No.: 09/652,808

(22) Filed: Aug. 31, 2000

(51) Int. Cl.$^7$ .............. A47J 37/00; A47J 37/04; A47J 43/18; A23L 1/00
(52) U.S. Cl. .............. 99/339; 99/345; 99/347; 99/419; 99/426; 99/448; 99/449; 99/450
(58) Field of Search ........ 99/339, 340, 345–347, 99/415–418, 403, 419–421 V, 425, 426, 444–450, 401; 126/25 R, 9 R, 41 R; 426/523, 509

(56) References Cited

U.S. PATENT DOCUMENTS

| | | |
|---|---|---|
| 1,349,302 | 8/1920 | Spitz . |
| 2,821,904 | 2/1958 | Arcabosso . |
| 3,020,824 | 2/1962 | Pantermoller . |
| 3,363,544 * | 1/1968 | Eriksen ................................ 99/426 |
| 3,392,665 | 7/1968 | Harnest . |
| 3,713,378 | 1/1973 | West . |
| 4,450,759 | 5/1984 | Steibel . |
| 4,557,188 * | 12/1985 | Spanek ................................ 99/415 |
| 4,633,773 | 1/1987 | Jay . |
| 4,709,626 | 12/1987 | Hamlyn . |
| 4,848,217 * | 7/1989 | Koziol ................................ 99/419 |
| 4,924,768 * | 5/1990 | Jay ..................................... 99/425 |
| 5,069,117 * | 12/1991 | Schlessel .............................. 99/419 |
| 5,081,916 | 1/1992 | Kuhling . |
| 5,106,642 * | 4/1992 | Ciofalo ............................... 426/509 |
| 5,301,602 | 4/1994 | Ryczek . |
| 5,501,142 * | 3/1996 | Bailey ............................ 99/345 X |
| 5,538,050 * | 7/1996 | Galdon ........................... 99/426 X |
| 5,575,198 | 11/1996 | Lowery . |
| 5,662,028 * | 9/1997 | Fraga .................................. 99/419 |
| 5,791,235 * | 8/1998 | Anselmo .............................. 99/426 |
| 5,842,409 * | 12/1998 | Loffler ........................... 99/426 X |
| 5,893,320 | 4/1999 | Demaree . |
| 6,062,131 | 5/2000 | Holland . |

OTHER PUBLICATIONS http://cajunbbq.com/cookerhistory.html ("Cajun BBQ Cooker History and how the Cajun BBQ Cookware works") Jul. 6, 2000.

* cited by examiner

Primary Examiner—Timothy F. Simone
(74) Attorney, Agent, or Firm—Technoprop Colton LLC

(57) ABSTRACT

A device for cooking fowl on a can having a first piece having a top edge, a bottom edge, a first side, a second side, a first end and a second end, wherein the first end has a first horizontal loop structured to receive and secure a first flavoring can and the second end has a second horizontal loop structured to receive and secure a second flavoring can, whereby the device is placed onto a heating source with at least one flavoring can received and secured within at least one horizontal loop, and with a whole fowl mounted over each of the at least one flavoring can.

16 Claims, 5 Drawing Sheets

DEVICE FOR COOKING FOWL

BACKGROUND OF THE INVENTION

1. Technical Field

The field of the invention relates generally to devices for cooking fowl, and more specifically to devices for roasting or barbecuing whole fowl in an upright position on or in open or closed heating devices or chambers.

2. Prior Art

One method of cooking whole fowl is to support the fowl in an upright position within the heating chamber. This allows the body cavity to drain naturally by gravity while cooking, avoiding a build up of fats and other juices within the body cavity. Various devices have been developed to support the fowl in an upright position for cooking in this manner. Further, it is known to insert hollow devices within the body cavity of the fowl while cooking to allow more thorough cooking, and to include water or flavored solutions within the hollow devices to keep the interior of the fowl moist and to add flavor while cooking in this manner. Simply, the flavored solution, which may be water with added spices and herbs, is placed within the hollow device and when heated, evaporates into the body cavity of the fowl, permeating the flesh of the fowl.

It also is known to use a typical can as the hollow device inserted within the body cavity of the fowl. For example, many people like the flavor of fowl cooked in beer. These people place a partially filled can of their favorite beer, open end first, within the body cavity of the fowl, and place the fowl upright on, for example, a barbecue grill. As the partially filled can is heated, the beer evaporates into the body cavity of the fowl, permeating the flesh of the fowl, and imparting flavor to the cooking fowl. However, it is difficult to keep the fowl balanced upright on the grill, as the can provides the only support for the fowl. The fowl often tips over and needs to be righted by the chef. Thus, this type of fowl often is referred to as a "drunk chicken" or a "tipsy chicken".

Although the prior art includes an array of devices intended to roast or barbecue grill fowl, the prior art does not disclose a simple and inexpensive device to support a fowl on a can or other container for optimal flavoring and roasting. Many devices in the prior art support a fowl in a vertical position to aid in cooking a flavored fowl, such as pipe-like devices that are inserted into the fowl prior to and during cooking. Further, the prior art does not disclose either a device to cook multiple fowl simultaneously or for using the relatively new tradition of cooking a fowl on a can.

U.S. Pat. No. 4,450,759 to Steibel discloses a stand for roasting fowl with a removable handle. The '759 patent comprises two plates that couple and insert into the fowl for roasting. The stand cooks at most one fowl and does not accommodate cans or a solution reservoir for flavoring.

U.S. Pat. No. 4,633,773 to Jay and U.S. Pat. No. 4,709,626 to Hymlyn each disclose a holder for roasting fowl comprising a detachable pan and a bent wire element. Although the bent wire element holds or supports a fowl, it does not allow for roasting a fowl on a can or container. Moreover, this prior art does not provide for a solution reservoir for flavoring, but only a pan for the collection of fat and other juices.

U.S. Pat. No. 5,301,602 to Ryczek discloses an apparatus for roasting poultry that comprises a supporting structure that may contain a reservoir of solution. Although an array of solutions may be accommodated by this invention, the user must take the extra step of pouring the flavoring solution of other liquid into the reservoir structure.

U.S. Pat. No. 5,575,198 to Lowery discloses a ceramic meat cooker that is inserted into the fowl and placed on a grill. The device in '198 does not accommodate flavoring solutions or cans, but merely collects the fat and other juices.

U.S. Pat. No. 5,893,320 to Demaree discloses a device that fits within a fowl that holds and orients the fowl vertically for cooking. This device includes a reservoir for a solution, disclosed as a means for keeping the interior of the fowl moist. A fowl having a can inserted within its body cavity cannot be stably mounted on this device.

U.S. Pat. No. 6,062,131 to Holland discloses a roasting stand that includes a hollow tube for flavoring a fowl. The roasting stand comprises a pipe-like element for insertion into the fowl and a reservoir in the pipe-like element for placing a solution for flavoring the fowl. A separate can inserted within the body cavity of the fowl cannot be stably mounted on this device and, as in Ryczek '602, the user must take the extra step of transferring the contents from the can to the pipe-like element.

One problem with the known prior art methods of cooking fowl in this manner is the stability of fowl on the beer can or other container. Chefs struggle to keep the bird from falling over and spilling the contents of the beer into the flames or on themselves. This lack of stability coupled with the possible flammability of the contents of the can creates a potentially injury producing situation.

Another problem with the known prior art methods of cooking fowl in this manner is transporting the fowl on the can from the heating source to another desired location. Relocation of the can is troubling because the fowl is hot and it is on a hot metal can. Moreover, in this position, there is not a convenient handle to grasp the fowl, and chefs have struggled to move the cooked fowl. A device that allows for the stable, convenient transport of the fowl from the heat source to a desired location will also improve this method of cooking fowl.

Thus it can be seen that there exists a need for a device that will allow a chef to cook fowl in an upright position, with a can containing a cooking solution inserted within the body cavity of the fowl, so that the device supports the can, thus supporting the fowl, and preventing the fowl and can combination from tipping over while cooking. It is to this end that the present invention is directed.

BRIEF SUMMARY OF THE INVENTION

The present invention is a novel device that makes it easier to cook a "drunk chicken". The device is a structure that has one or more means for securely supporting a typical soft drink or beer can in an upright position such that when a bird is placed over the can in an upright position, the bird and can combination will not easily tip over. Preferably, the device has two or more means for securely supporting two or more bird and can combinations such that two or more birds can be cooked at the same time and not significantly contact each other. A handle also is preferred, allowing the chef to dress the birds, place the cans within the body cavities of the birds, and place the bird and can combinations within the device at a location away from the heating chamber, and then carry the bird and can combinations to the heating chamber for cooking, and then remove the cooked meal from the heating chamber.

Briefly, in use, a can is inserted into the body cavity of a dressed bird. The can may contain a soft drink, fruit juice, beer, or any other liquid including plain water. The bottom inch or so of the can typically and preferably extends out of the body cavity of the bird. The bottom inch or so of the can then is placed within the device, where it is held securely in an upright position. Alternatively, the can may be placed within the invention, and then the bird placed over the can. The entire device, including the one or more bird and can combinations, then is placed on or in the heating chamber, typically a barbecue grill or an oven. Once the birds are cooked to perfection, the entire device is lifted off of or out of the heating chamber and the birds are served with the chef's favorite side dishes.

This cooking process adds beer flavor, or the flavor of whatever was in the can, to the fowl and creates a very pleasant tasting fowl. The cooked, final product typically is a moist and tender fowl, as it has been basted from within. An additional advantage to this cooking method is that the can may be discarded after use, thus reducing cleaning time, effort, and materials.

It is an objective of the instant invention to provide an apparatus that stabilizes fowl on a can for cooking fowl.

It is another object of the instant invention to provide a safer method of cooking fowl on a can by adding stability to the can fowl structure.

It is another object of the instant invention to provide an apparatus that reduces the cleanup time after cooking a fowl on heat-source.

It is another object of the instant invention to provide a simple and improved fowl-roasting stand with a convenient handle that allows convenient transportation of the fowl on the can.

It is another object of the instant invention to provide a device that is easy to manufacture and when coupled with a can or container provides an improved fowl-roasting stand.

It is another object of the instant invention to provide an apparatus that minimizes the additional costs of cooking a chicken on a heat-source.

It is another object of the instant invention to provide an apparatus that more efficiently uses space in a heat-source.

It is another object of the instant invention to provide an apparatus that does not have the problems of materials building up within it and thus reducing its effectiveness.

These objects, and other objects, features and advantages of the present invention, will become more apparent to those of ordinary skill in the art when the following detailed description of the preferred embodiments is read in conjunction with the attached drawing figures.

DETAILED DESCRIPTION OF THE PREFERRED EMBODIMENTS

The present invention is a novel device for cooking fowl in an oven, on top of a stove (either in a frying pan or in an open or covered pot), and preferably on an electric or gas-fired (both can be indoor or outdoor) or charcoal (preferably outdoor) grill. The device is a structure that has one or more means, and preferably either two or four means, for securely supporting a typical soft drink or beer can (referred to as a flavoring can) in an upright position such that when a bird is placed over the can in an upright position, the bird and can combination will not easily tip over. Typically, in use, either a flavoring can is inserted into the body cavity of a dressed bird or a dressed bird is placed over a flavoring can. The flavoring can may contain a soft drink, fruit juice, beer, or any other liquid including plain water or cooking oils, which themselves may contain spices and/or herbs. The bottom inch or so of the can typically and preferably extends out of the body cavity of the bird and is held securely in an upright position within the invention. The entire device, including the one or more bird and flavoring can combinations, then is placed on or in the heating source. A handle also is preferred, allowing the chef to dress the bird(s) at a location away from the heating source, place the bird(s) on the invention, and then carry the dressed bird(s) on the invention to the heating source for cooking. Once the bird(s) is/are cooked to perfection, the invention is removed from the heating source and the bird(s) are served with the chef's favorite side dishes. This cooking process adds the flavor of whatever was in the flavoring can to the fowl, and creates a very pleasant tasting fowl. The cooked, final product typically is a moist and tender fowl, as it has been basted from within. One advantage to this cooking method for the typical weekend chef is that the flavoring can may be discarded after use, thus reducing cleaning time, effort, and materials.

Figure 1:
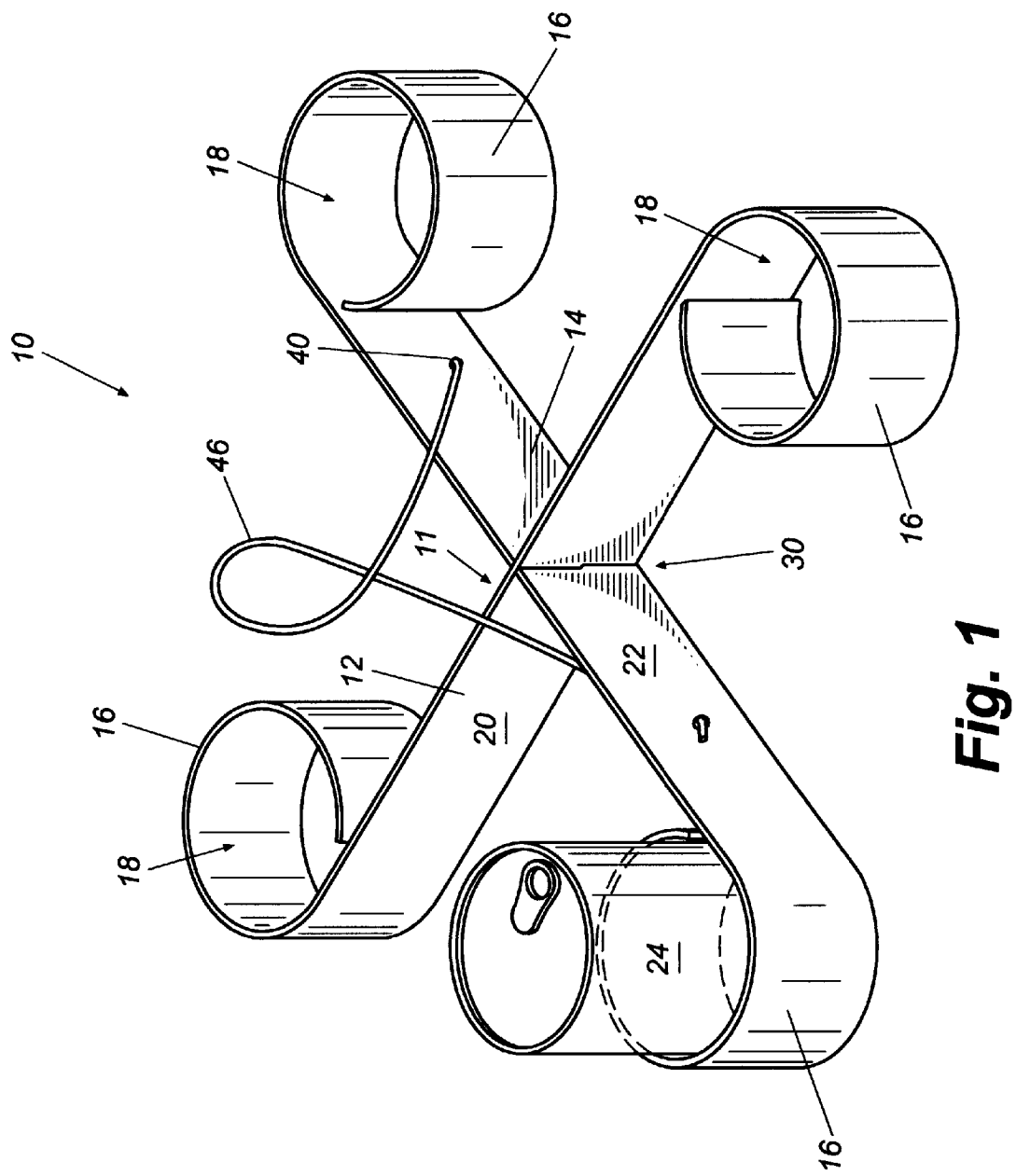
FIG. 1 is a perspective view of a first embodiment of the invention having four cooking positions.
Figure 2:
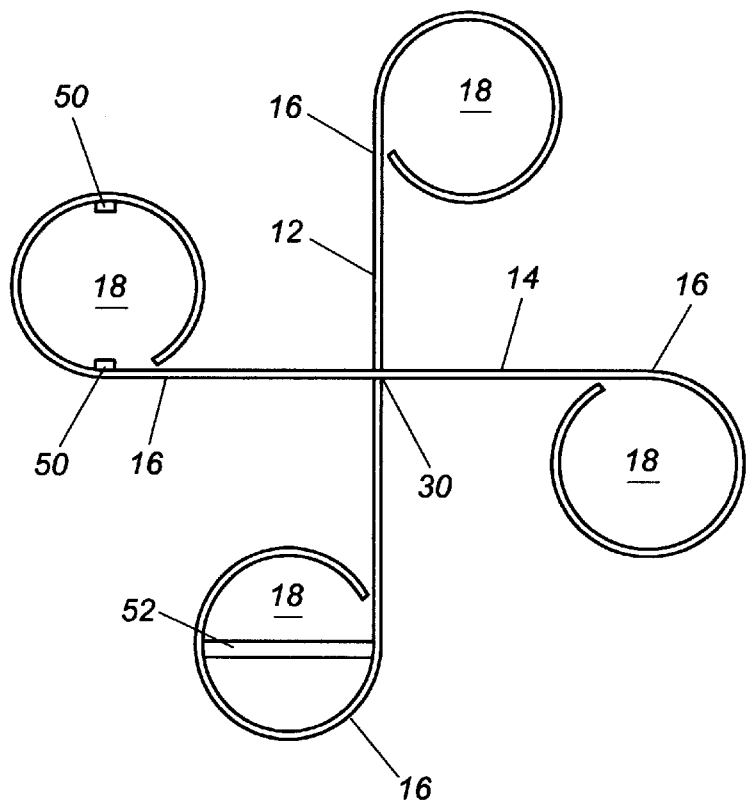
FIG. 2 is a top plan view of the apparatus in FIG. 1.
Figure 3:
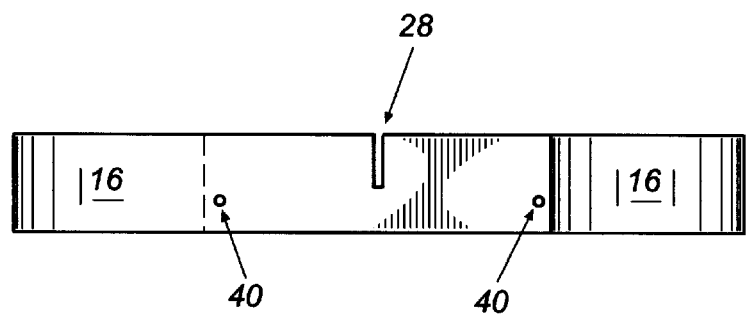
FIG. 3 is a side plan view of a first piece of the apparatus shown in FIG. 1.
Figure 4:
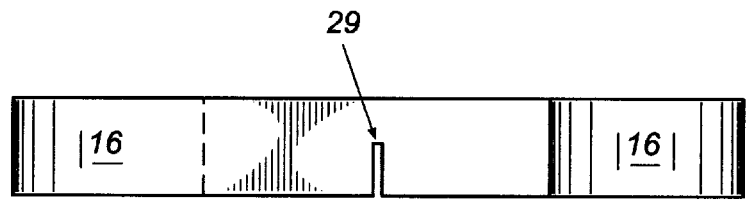
FIG. 4 is a side plan view of a second piece of the apparatus shown in FIG. 1.
Figure 5:
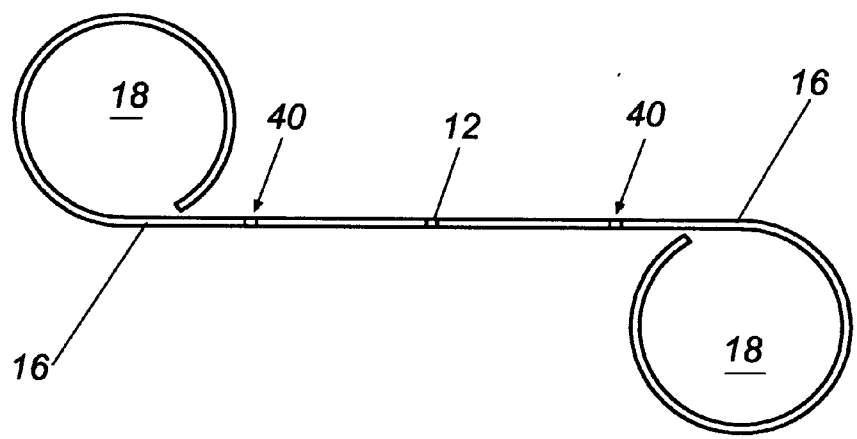
FIG. 5 is a top plan view of a second embodiment of the invention having two cooking positions.
Figure 6:
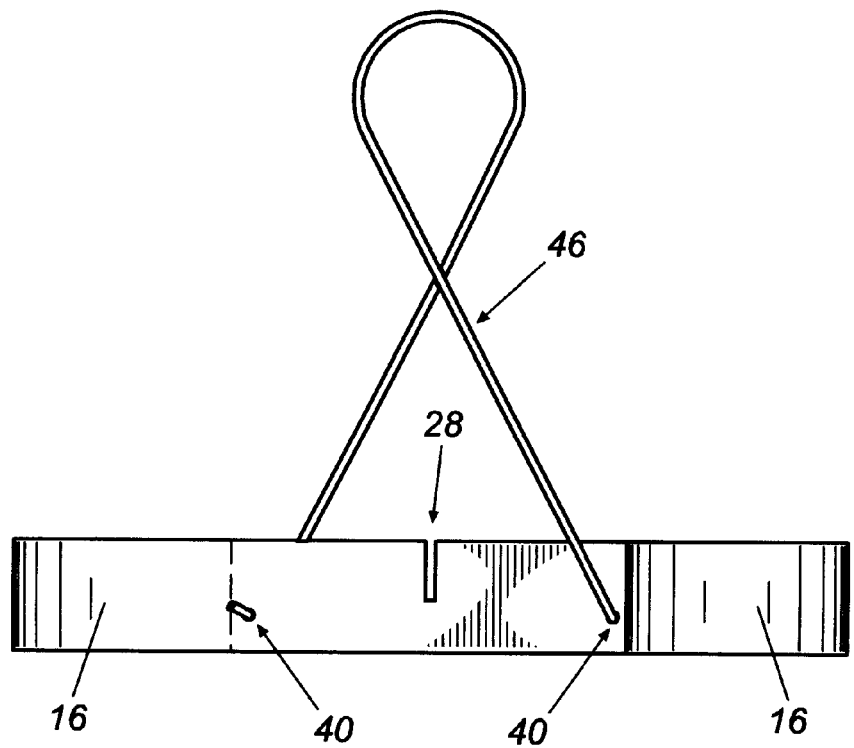
FIG. 6 is a side plan view of the piece of the invention shown in FIG. 3 and incorporating a handle.
Figure 7:
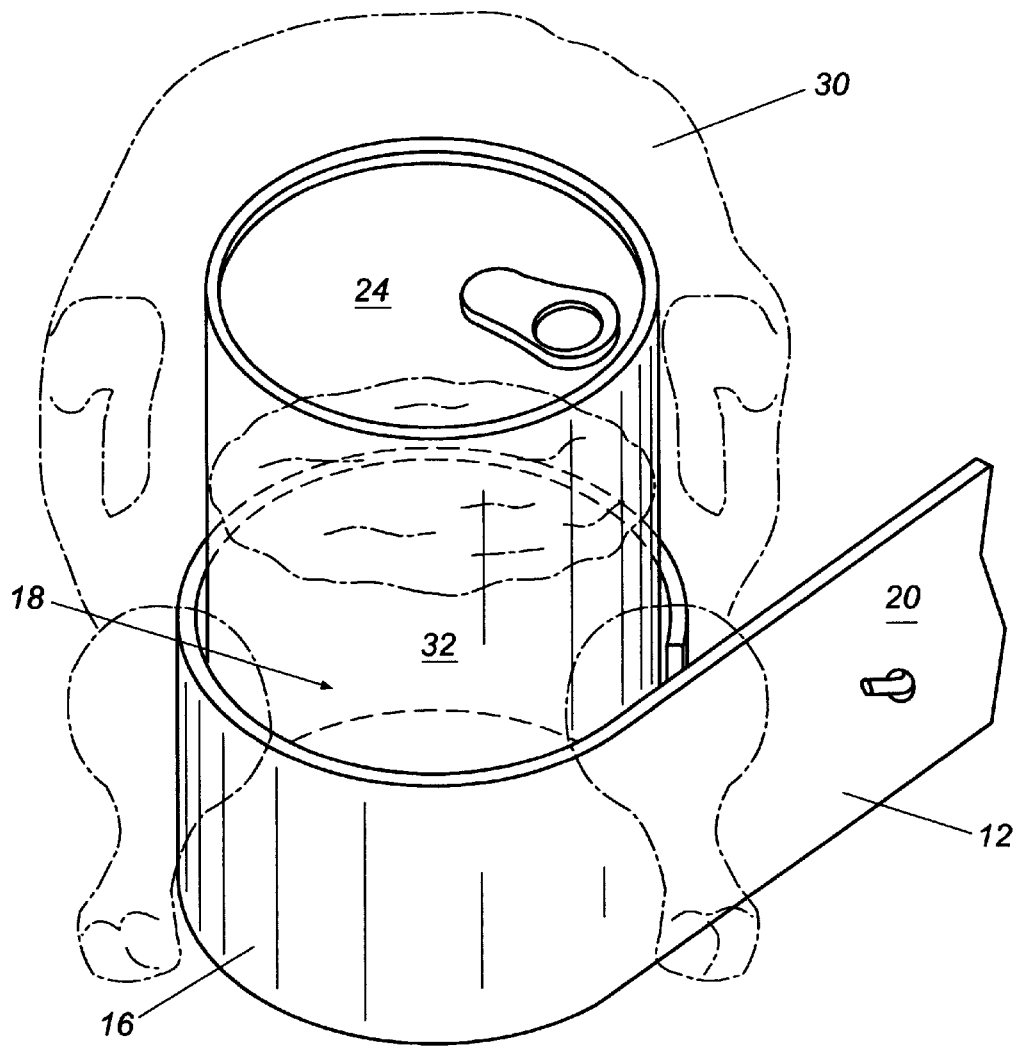
FIG. 7 is perspective view of a bird and can combination on one of the four possible positions on a first embodiment of the invention.
Figure 8:
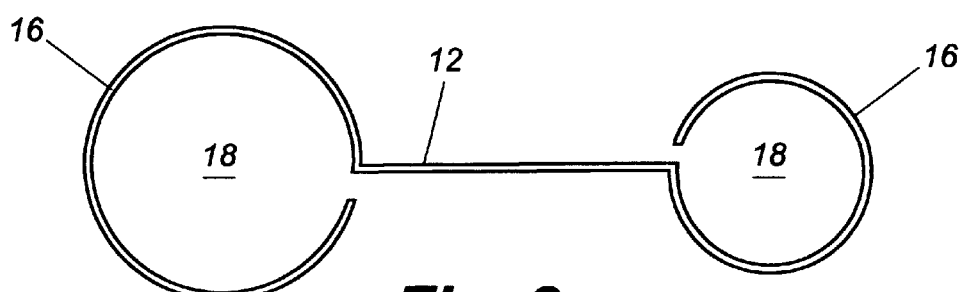
FIG. 8 is a top plan view of a third embodiment of the invention having alternate can securing structures.

Referring now to FIGS. 1–8 the preferred embodiments of the invention are shown, having the inventive aspects described in the forgoing summary of the invention. FIG. 1 is a perspective view showing the major parts of an assembled first embodiment of the instant invention. FIG. 2 is a top plan view of an assembled first embodiment of the invention in the preferred configuration for cooking up to four birds. FIGS. 3 and 4 show side plan views of disassembled can and fowl support pieces of the invention. FIG. 5 is a top plan view of an assembled second embodiment of the invention in the preferred configuration for cooking up to two birds. FIG. 6 is a side plan view of a partially assembled first embodiment of the invention prior to the addition of a second fowl support piece (for cooking a third and fourth bird), and/or of an assembled second embodiment of the invention (which would not necessarily have slot 28). FIG. 7 shows a perspective view of a flavoring can supported within the invention, with a bird to be cooked (shown in phantom lines) mounted on the flavoring can. FIG. 8 shows a top plan view of a third embodiment of the invention having different sized can securing spaces, and a different method of creating the can securing spaces.

FIG. 1 is a perspective view of the instant invention showing a first embodiment of the device 10 capable of cooking up to four birds at a time. This embodiment of the invention comprises a scrolled cruciform having a central cross shaped portion 11 with each of the four ends of the cross shaped portion 11 ending in a scrolled or curled arm 16 defining a flavoring can securing space 18. The cross shaped portion 11 preferably is large enough both to provide a stable platform for the device 10 when the device 10 is placed on the heating source with one or more birds mounted on the device 10, and to separate the birds from each other a sufficient distance so that if two or more birds are being cooked at the same time, the cooking birds will not touch each other (which may affect the cooking process).

Preferably, the cross shaped portion 11 comprises two beams or pieces 12 and 14 each having two ends that curl to form the arms 16 defining the can securing spaces 18, basically in an "S" configuration, for holding the flavoring can(s). Each piece 12, 14 further comprises a central, generally straight section 20, 22 located between each of the arms 16. Each piece 12, 14 has a uniform thickness and preferably is made from a heat-resistant material such as steel, aluminum or other metals, or a ceramic. Centrally located on each piece 12, 14 is a slot 28, 29 either on the top or bottom of the piece 12, 14 respectively. In the cruciform embodiment, capable of cooking up to four birds at a time, the pieces 12, 14 are arranged into the cruciform and intersect at 30, where slots 28, 29 are located. Slots 28, 29 cooperate with each other to stably and reversibly secure piece 12 to piece 14. Each slot 28, 29 preferably extends half of the height of each piece 12, 14, such that when pieces 12, 14 are secured to each other, the tops edges and bottom edges of each piece 12, 14 respectively lie in the same plane.

A handle 46 may be attached at various points on the device 10, preferably at two points 40 along one beam of the cross shaped portion 11, to aid in the placement and removal of the device 10 on the heating source. Handle 46 may be attached to the device 10 by any of the known methods, such as adhesives, weldments, rivets, bolts and the like. Preferably, points 40 are holes through the thickness of piece 12, and handle 46 is a heavy gauge wire properly shaped and having two ends, each of which is placed through one of points 40 and bent to secure handle 46 in piece 12.

Flavoring can(s) 24, such as a typical soft drink or beer can as indicated in phantom lines in FIG. 1, fits in can securing space(s) 18 and is stably secured therein by curled arm(s) 16 of piece 12, 14. Arm(s) 16 may be curled to create can securing space(s) of any selected size, with the preferred radius being equal to or slightly greater than the radius of the typical 12-ounce soft drink or beer can. Arm(s) 16 may be curled tighter or looser upon manufacture of the device 10, or by the user, to accommodate larger or smaller diameter cans. There is no requirement that each can securing space 18 on each piece 12, 14 be of the same diameter. In the embodiment shown in FIG. 1, up to four birds may be placed on top of the cans 24 in can securing spaces 18.

FIG. 2 is a top plan view of an assembled first embodiment of the invention in the preferred configuration for cooking up to four birds, and shows four can securing spaces 18 for can(s) 24. As will be disclosed in more detail below, pieces 12, 14 intersect 30 to create the cruciform structure. Preferably, pieces 12, 14 intersect at right angles for optimal stability and bird separation while cooking. Also shown in FIG. 2 are two different embodiments of optional stops 50, 52 to prevent can(s) 24 from sliding through can securing space(s) 18. Preferably, as mentioned above, can securing space(s) 18 have a diameter very close to the diameter of the can(s) 24 to be secured, thus holding the can(s) 24 within can securing space(s) 18 by friction. However, for added safety and security, various stops 50, 52 can be added to the bottom edge of the arm(s) 16 to prevent can(s) 24 from sliding through can securing space(s) 18. Stop 50 is a small tab protruding into can securing space 18 on which can 24 may rest. One or more stop(s) 50 may be used. Stop 52 is a strip extending across can securing space 18 from one side of arm 16 to another side of arm 16 on which can 24 may rest. Only one stop 52 should be necessary.

FIGS. 3 and 4 show side plan views of disassembled can and fowl support pieces of the invention. In general, pieces 12, 14 are identical, with the exception of the placement of slots 28, 29. For the four-bird embodiment, slot 28 is cut into the top edge of piece 12 and slot 29 is cut into the bottom edge of piece 14. This allows piece 14 to be placed over piece 12 such that slots 28, 29 cooperate with each other in securing pieces 12, 14 together. Further, piece 14 will now rest on piece 12 at the slot location, allowing piece 12 to support piece 14 for added strength and security. For the two-bird embodiment, no slot 28, 29 is necessary as only one piece 12, 14 is necessary. The general positioning of points 40 for optimal attachment of a handle 46 to one of the pieces 12, 14 is shown.

FIG. 5 is a top plan view of an assembled second embodiment of the invention in the preferred configuration for cooking up to two birds. In this embodiment, only one piece 12 is required. Handle 46 may be attached or connected to points 40 on piece 12. Although a two-bird embodiment is perfectly acceptable, as are embodiments with the ability to cook any desired number of birds, the two-bird embodiment is somewhat less stable than an embodiment allowing the cooking of three or more birds.

FIG. 6 is a side plan view of a partially assembled first four-bird embodiment of the invention prior to the addition of a second fowl support piece (for cooking a third and fourth bird), and/or of an assembled second two-bird embodiment of the invention (which would not necessarily have slot 28). FIG. 6 also shows the preferred method of attaching a wire handle 46 to the device 10, that is, having a crossover configuration. This helps maintain the stability of the device 10 when it is lifted.

FIG. 7 shows a perspective view of a flavoring can supported within the invention 10, with a bird 30 to be cooked (shown in phantom lines) mounted on the flavoring can 24. Preferably, a portion of the flavoring can 24 extends out of the body cavity of the bird 30 a distance equal to the height of piece 12, 14 to allow the most support possible by the device 10. The bird 30 surrounds the flavoring can 24 and can rest on and even overlap the device 10. Obviously, the pop-top opening of the flavoring can 24 should be pointing upward, into the body cavity of the bird 30, to prevent the spilling of the contents of the flavoring can 24 and to allow the liquid in the flavoring can 24 to evaporate upwards into the body cavity of the bird 30.

FIG. 8 shows a top plan view of a third embodiment of the invention 10 having different sized can securing spaces 18 and a different method of creating the can securing spaces 18. For example, can securing spaces may be different sizes to accommodate different sized flavoring cans 24. Twelve-ounce cans come in different diameters. Likewise, other type of cans, such as soup cans, have different diameters than the typical soft drink or beer can. The invention contemplates having devices 10 that can accommodate a wide variety of flavoring cans 24. Also, the actual structure of the arm(s) 16 and can securing space(s) 18 does not have to be the scroll or "ES" shape, but can be a key-hole as shown in FIG. 8 or any other shape and structure to carry out the spirit of the invention, and can be determined by one of ordinary skill in the art without undue experimentation.

In use, the chef dresses the bird(s) 30 to be cooked, if desired. A flavoring can 24 for each bird is obtained. Each flavoring can 24 typically already has the desired liquid 32 in it (the contents of the can as purchased, such as beer or tomato soup), although other liquids with or without added flavorings may be placed in the flavoring can(s) 24. Either the flavoring can(s) 24 is/are placed in the can securing space(s) and the bird(s) 30 mounted over the flavoring can(s) 24 (that is, the flavoring can 24 is located within the body cavity of the bird 30), or the bird(s) is/are placed over the flavoring can(s) 24 and the flavoring can 24 and bird 30 combinations are placed in the can securing space(s) 18. The now ready for cooking device 10 is placed on or near a heat-source, preferably a barbecue grill, and left to cook. The heat passes through and around the device 10 and cooks the bird(s) 30. The heat also causes the liquid 32 to evaporate into the body cavity of the bird(s) 30. This helps to cooks the interior of the bird(s) 30 and permeates the flesh of the bird(s) 30 to produce a cooked bird 30 of a flavorful, moist and tender quality.

One advantage of the invention is its added stability, due to the cruciform or scrolled design. The device 10 supports the flavoring can(s) 24 while the bird(s) 30 is/are cooked and prevents the flavoring can(s) 24 from tipping with the bird(s) 30. An additional advantage of the invention is that it is more easily cleaned when compared to other bird cooking devices. The device 10 may be cleaned easily by washing its generally flat and open surface. More importantly, this device 10 differs from other cooking devices in that the element within the bird 30 that gets dirtiest (the flavoring can 24) is discarded in this invention while the analogous element is not discarded and must be cleaned in other inventions.

Figure 9:
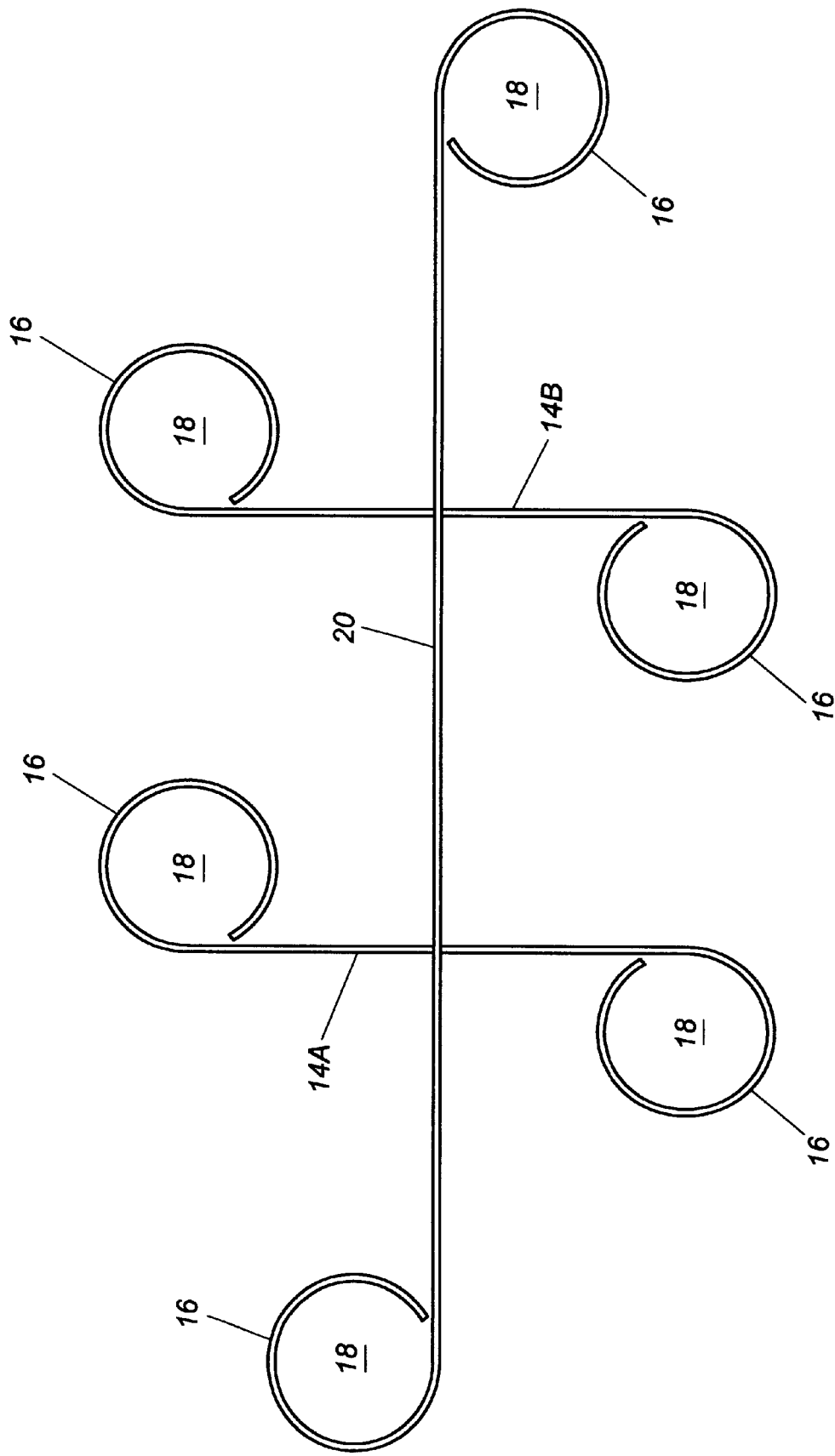
FIG. 9 is a top plan view of a fourth embodiment of the invention having six cooking position.

FIG. 9 is a top plan view of a fourth embodiment of the invention having six cooking position. FIG. 9 shows an example of a device 10 with more than four can securing spaces 18. Central section 20 of first piece 12 is elongated, and instead of room for one second piece 14 as a cross-member, there is room for two second pieces 14A, 14B as cross-members. Central section 20 can be further elongated to provide room for three or more second pieces 14.

The above disclosure and representative examples are meant to be illustrative of the invention and not to limit the scope or spirit as defined by the appended claims and their equivalents.

What is claimed is:

1. A device for cooking fowl comprising a first piece having a top edge, a bottom edge, a first side, a second side, a first end and a second end, wherein the first end comprises a first horizontal loop structured to receive and secure a first flavoring can and the second end comprises a second horizontal loop structured to receive and secure a second flavoring can, whereby the device is placed onto a heating source with at least one flavoring can received and secured within at least one horizontal loop, and with a whole fowl mounted over each of the at least one flavoring can.

2. The device as characterized in claim 1, wherein each of the first and second horizontal loops are structured to releasably receive and secure the first and second flavoring cans, respectively.

3. The device as characterized in claim 2, wherein the first piece is a structure having a length, a height and a thickness, the length being greater than the height and the height being greater than the thickness.

4. The device as characterized in claim 3, wherein the first piece has at least three distinct portions, the first horizontal loop, the second horizontal loop, and a central planar portion connecting the first horizontal loop to the second horizontal loop.

5. The device as characterized in claim 4, further comprising a handle secured to the central planar portion.

6. The device as characterized in claim 5, further comprising a second piece having a top edge, a bottom edge, a first side, a second side, a first end and a second end, wherein the first end comprises a third horizontal loop structured to receive and secure a third flavoring can and the second end comprises a fourth horizontal loop structured to receive and secure a fourth flavoring can.

7. The device as characterized in claim 6, wherein each of the horizontal loops is structured to releasably receive and secure the flavoring can.

8. The device as characterized in claim 7, wherein the second piece is a structure having a length, a height and a thickness, the length being greater than the height and the height being greater than the thickness.

9. The device as characterized in claim 8, wherein the second piece has at least three distinct portions, the third horizontal loop, the fourth horizontal loop, and a central planar portion connecting the third horizontal loop to the fourth horizontal loop.

10. The device as characterized in claim 9, wherein the height is sufficient to stably secure one or more flavoring cans placed within one or more of the horizontal loops.

11. The device as characterized in claim 10, wherein the first piece is releasably secured to the second piece.

12. The device as characterized in claim 11, wherein the central planar portions are of a sufficient length such that the whole fowl mounted on the flavoring cans received and secured in the horizontal loops do not touch each other.

13. A device for cooking fowl comprising:

a. a first piece having a top edge, a bottom edge, a first side, a second side, a first end and a second end, wherein the first end comprises a first horizontal loop structured to receive and secure a first flavoring can and the second end comprises a second horizontal loop structured to receive and secure a second flavoring can:

b. a second piece having a top edge, a bottom edge, a first side, a second side, a first end and a second end, wherein the first end comprises a third horizontal loop structured to receive and secure a third flavoring can and the second end comprises a fourth horizontal loop structured to receive and secure a fourth flavoring can, whereby the device is placed onto a heating source with at least one flavoring can received and secured within at least one horizontal loop, and with a whole fowl mounted over each of the at least one flavoring can.

14. The device as characterized in claim 13, wherein each of the horizontal loops are structured to releasably receive and secure a flavoring can, respectively.

15. The device as characterized in claim 14, wherein the first piece is releasably secured to the second piece.

16. The device as characterized in claim 5, further comprising additional pieces, each having a top edge, a bottom edge, a first side, a second side, a first end and a second end, wherein the first end comprises an additional horizontal loop structured to receive and secure an additional flavoring can and the second end comprises an additional horizontal loop structured to receive and secure an additional flavoring can.

* * * * *